UNITED STATES PATENT OFFICE.

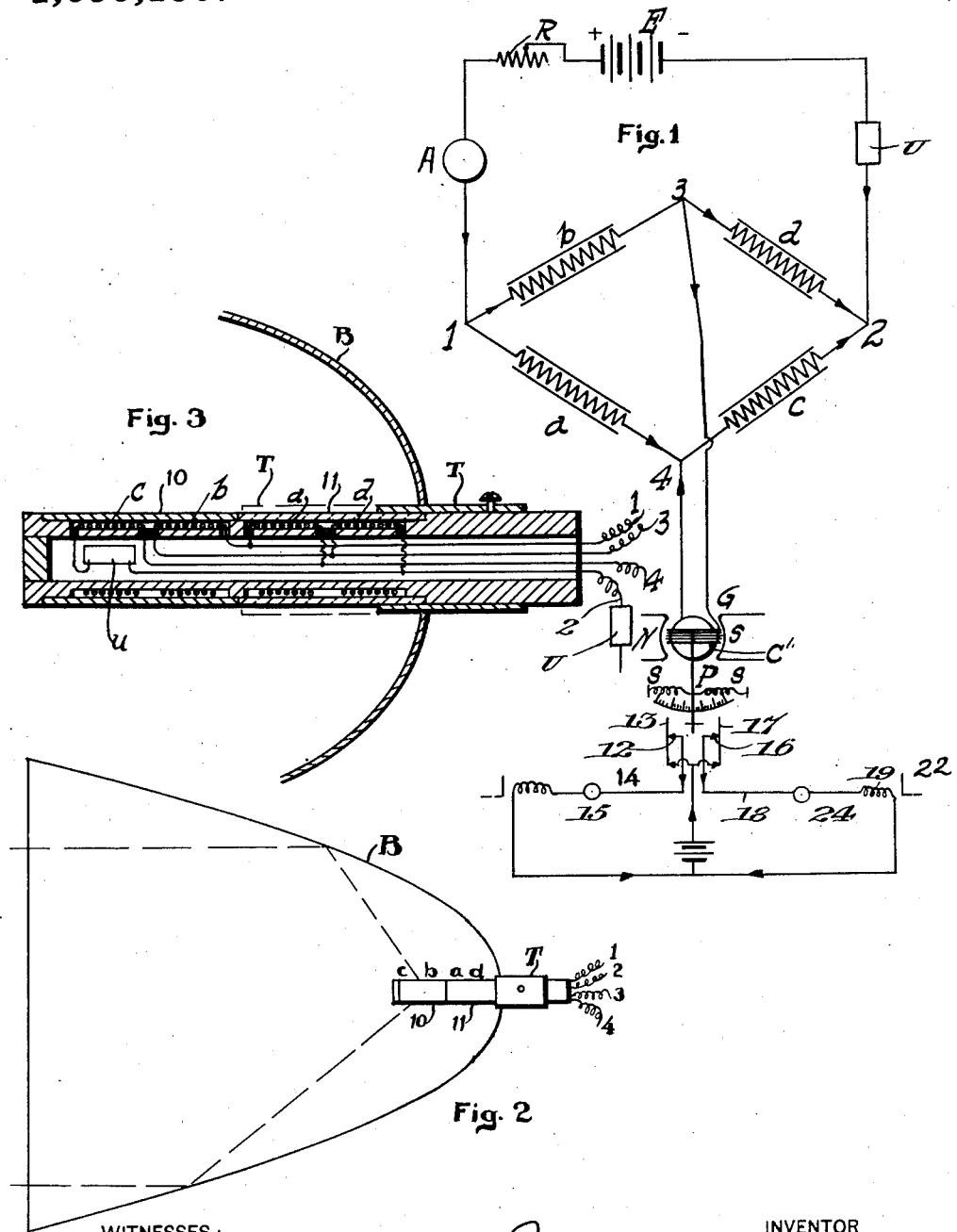

RALZEMOND DRAKE PARKER, OF ANN ARBOR, MICHIGAN.

THERMIC BALANCE OR RADIOMETER.

1,099,199.   Specification of Letters Patent.   Patented June 9, 1914.

Application filed July 31, 1912. Serial No. 712,394.

*To all whom it may concern:*

Be it known that I, RALZEMOND DRAKE PARKER, a citizen of the United States, residing at Ann Arbor, county of Washtenaw, State of Michigan, have invented a certain new and useful Improvement in Thermic Balances or Radiometers, and declare the following to be a full, clear, and exact description of the same, such as will enable others skilled in the art to which it pertains to make and use the same, reference being had to the accompanying drawings, which form a part of this specification.

This invention relates to thermic balances or radiometers and has for its object an improved instrument capable of detecting the presence of a body by its sensitiveness to the ethereal radiation produced by that body and it consists in improvements in radiometers as well as in a novel adaptation thereof to produce an instrument sensitive only to the energy radiated by bodies, and also rugged enough to be used as a commercial instrument with particular reference to its use as a detector of the presence of cold bodies, as icebergs. I accomplish this and the other objects by the apparatus hereinafter described:

In the drawings: Figure 1, is a diagram of the electrical features of the instrument. Fig. 2, is a section of a parabolic mirror that is used to focus the radiant energy upon a certain part of the instrument. Fig. 3, is a section of the receiving tube which is affected by the radiant energy.

B is a parabolic mirror arranged to focus the radiation at a given point or place. This place and the focusing is shown by the dotted lines in Fig. 2. The rays are focused on a portion of a tube which projects in the axis of and through the rear of the mirror, which portion is characterized as $c, d$.

Referring to Fig. 3, it will be seen that $c$ and $b$ indicate coils both being covered by a mica cylinder 10. $a$ and $d$ each indicate coils which lie under a silvered glass cylinder 11 which reflects the ethereal radiation and prevents the conduction of the ethereal radiation to the coils. Other material may be used to reflect such radiation, as, for instance polished metal. T is a sleeve made of non-conducting material for heat and is adapted to pass over and cover more or less of the silvered glass cylinder 11 and the mica cylinder 10. By sliding it along the surface of those cylinders it extends through the mirror B encircling the casing 11 and may be, if necessary, held in adjustment by an ordinary set screw or any other convenient means. In Fig. 3 of the drawings the cylinder is shown by solid lines, and the extent to which it may be slid along and cover the silvered glass cylinder 11 is shown by the dotted lines. While I prefer to use the sleeve in this manner, it is not strictly essential to the operation of the device as it is expected that the silvered glass cylinder 11 will effectually reflect the radiant heat. The mica cylinder 10 acts as a conductor of the radiation to coils $c, b$ but any other equivalent substance, such as rock salt, could be used to accomplish this function. Each of these coils $a, b, c$, and $d$ is a part of the well known Wheatstone's bridge which is illustrated diagrammatically in Fig. 1. It is, therefore, obvious that radiation affects the coils $c$ and $b$ to a greater degree than coils $a$ and $d$.

By comparing Figs. 1 and 3, it will be observed that the conductor 1, in each figure, leads from the junction of windings $a$ and $b$ and that the conductor 2 leads from the junction of windings $c$ and $d$. The bridge wire 3, in each figure, leads from the junction of $b$ and $d$, and the bridge wire 4, in each figure, leads from the junction of coils $a$ and $c$. The bridge wires lead to a galvanometer G which indicates any differences in potential in a well known way that needs no explanation.

E, is a source of electromotive force. R, is a rheostat for controlling the flow of current through the circuit and A is an ammeter for indicating the magnitude of the current flow. The object of this electromotive force is twofold, first, to supply energy to the galvanometer and secondly to heat the coils $a, b, c, d$ by means of the electric current to a proper constant degree above atmospheric temperature.

Since the transfer of energy between two bodies by radiation depends on the difference of the fourth powers of their absolute temperatures, warming the radiating portion of the bridge to and maintaining it at a moderate temperature above and independent of atmospheric conditions will enormously improve its sensitiveness and reliability for the detection of colder bodies.

It is well understood that the resistance of conductors changes with the temperature, hence when radiation strikes the mica 10, it is conducted through that covering, changes the temperature of the coils $b$ and $c$ and changes the electrical resistance of windings $b$ and $c$. Therefore since these coils are arranged with respect to the complete Wheatstone's bridge as indicated in the diagrammatic figure there is a change in the current flowing through the galvanometer G, irrespective of the predetermined initial temperature of the coils. The material of which the coils or windings are made may have a plus or minus temperature coefficient, which coefficient should be as large as possible. It is evident that a material with a minus coefficient is the more suitable for great sensitiveness, once stability is secured, since the heating effect of the current in the coil then aids in causing a change of potential to act on the galvanometer.

In the Wheatstone bridge as represented in Fig. 1, the electromotive force impressed on the galvanometer is the difference between the fall of potential over the resistance $b$ and the fall of potential over the resistance $a$. A change in the electromotive force impressed on the galvanometer therefore arises from a change of resistance, or of current, or of both in one or both of these resistances. With direct currents the fall of potential over a resistance is equal to the product of the resistance by the current through the resistance. In order to obtain a maximum change in electromotive force acting on the galvanometer due to a given change in resistance, the current should be as independent of the resistance changes as possible and as large as is consistent with the size of conductor employed and the amount of heating allowable. Since the resistance of a conductor at any temperature is given by the expression $$R t = R o (1 \pm B t)$$

it is evident that a change of resistance arising from a change of temperature from $t$ to $t'$, is equal to the product $BRo(t-t')$ and $Ro$ should be a large quantity in order for the instrument to be sensitive to small changes of temperature. The two coils $b$ and $c$ are each made sensitive to radiation as hereinbefore described and placed at such points in the Wheatstone bridge, as indicated in Fig. 1 that the galvanometer or indicating device will be subjected to a maximum change of electromotive force for a given absorption of radiant energy. The instrument would record were but one coil affected by radiation, but, inasmuch as it is the law of the Wheatstone bridge that for a balance $$\frac{\text{Resistance of } b}{\text{Resistance of } d} = \frac{\text{Resistance of } a}{\text{Resistance of } c}$$

it is evident that if the resistances of $b$ and $c$ are both increased the ratios become more unequal than if one alone is increased, hence the changes in electromotive force will be greater and the instrument will be more sensitive, other factors being the same.

From the above it is evident that the loss of absorption of radiant energy by the sensitive radiating portions of the bridge merely controls the amount of current or energy supplied to the galvanometer circuit, the electromotive force E being large enough to operate this galvanometer though the temperature changes are extremely slight.

It is evident that the instrument may be so designed that under normal conditions a current will flow through the bridge wires 3 and 4, as shown by the arrows. This current would cause the pointer P to turn were not this tendency overcome by a light spring S which causes the pointer to take a neutral position under normal conditions. This provision is made so that if at any time the current in the circuit fails, the position of the pointer will change and indicate this failure which may be remedied before the instrument has met with an occasion where it is called upon to register the presence of such objects as it was designed to indicate.

In the apparatus I have shown normally closed electrical circuits 14 and 18, each including an electric lamp and a magnetically operated device. These circuits are opened by the movement in either direction of the arm or pointer P as hereinafter described. It is evident that any type or kind of indicating device working on the principle of cessation of current flow may here be employed.

If there is any small change in the radiation, it is quickly detected by reason of the focusing of the radiation upon the mica 10 and its conduction through to the coils $c$ and $b$ where the energy is absorbed by their blackened surfaces and their resistances thereby changed. An increase of temperature, say, causes more resistance, if the temperature coefficient is positive, in the arms $c$ and $b$ and hence less current flows through the bridge wires 3 and 4 in the direction of the arrow, and the galvanometer moves to the right. If it moves as far as the terminals 16 and 17, it opens the circuit 18 which deenergizes the magnet 19 and drops armature 22, and extinguishes the light 24, or operates any other signal. This immediately shows the presence of some hotter body. If, instead of the temperature of $c$ and $b$ increasing, the temperature decreases, then their conductivity is improved, with positive temperature coefficient, and a somewhat higher potential difference will be established between 3 and 4 and more current will flow through the galvanometer and the pointer will swing to the left. If it swings far enough, it will strike the terminals 12 and 13 and open the circuit 14 extinguishing the incandescent light 15 or actuating any other signal depending on a cessation of the current that may be used in its place or in addition to it. This will show the presence of some colder object.

It will be understood that by fixing the position of the parabolic mirror all objects except those directly within the opening of the mirror may be excluded from affecting the instrument. Therefore in using the device upon boats, it may be arranged to be faced in the direction of travel of the boat so that only radiant bodies as icebergs that are in or near the path of the ship will affect it. Of course it may be arranged to be swung into any position or direction. It is not susceptible to mere atmospheric changes since all four windings are of the same material substantially equal in resistance, and the thickness of the protective coatings is so designed that the coils will cool or warm at the same rate due to loss or increase of heat by conduction and correction of which adjustment is obtained by means of the sleeve T.

In order to maintain a constant temperature of the bridge coils, a controller U for the rheostat may if desired be inserted in the circuit, but such constant temperature is not strictly essential to the operation of the device. As these controlling devices are not new it is unnecessary to describe them in detail.

It is obvious from the foregoing description that the form and general arrangement of the device, as a whole, might be extensively departed from that shown and described without departing from the invention. I have only attempted to describe the principles and illustrate sufficiently to have them understood without going into details of practical arrangement which it is obvious might be made to depend, and probably would be made to depend upon particular surrounding circumstances; for instance, the indicating device might be placed, say, in a pilot house at some distance from the reflector and coils, or they might even be carried to the engine room, or even duplicated in each place though on the same lines and affected by the same instrument without departing from the invention.

It is obvious that the details of the arrangement I have shown and described may be widely varied without departing from my invention and I do not wish to be confined to those and their exact structure.

What I claim is:—

1. In combination, four resistances for an electric current arranged in pairs of two resistances each, two such coupled resistances adapted to be affected by radiant heat, means for concentrating radiant heat thereon, the remaining two coupled resistances being screened therefrom, means for such screening substantially as described, means for electrically connecting the coupled resistances whereby the changes in electromotive force due to the changes in temperature are impressed in the same direction on a current-indicating instrument, and said current-indicating instrument, substantially as described.

2. The combination and arrangement of two pairs of substantially equal resistances as $c—b$ and $a—d$, means for subjecting each pair to a substantially equal and simultaneous supply of heat energy by conduction, means for subjecting one of the pairs to radiant heat energy, and means for barring the other pair therefrom.

3. The combination and arrangement of two pairs of substantially equal resistances as $c—b$ and $a—d$, means for subjecting each pair to a substantially equal and simultaneous supply of heat energy by conduction, means for subjecting one of the pairs to radiant heat energy, means for barring the other pair therefrom, a source of electrical energy connected to the pairs so as to develop a current therethrough, and an indicator in the path of said current.

4. The combination and arrangement of two pairs of substantially equal resistances as $c—b$ and $a—d$, means for affecting them equally and simultaneously by conduction of heat energy, means for subjecting one of said pairs to radiant heat energy, means for barring the other pair therefrom, a source of electrical energy so connected to the pairs as to develop a current therethrough, and an indicator adapted to show changes in resistance in one pair caused by the heat radiation operating on one of the resistance pairs.

5. The combination and arrangement of two pairs of resistances as $c—b$ and $a—d$, means for subjecting one of the pairs to radiant heat energy, means for screening the other pair therefrom, a source of electrical energy supplying an electric current through both pairs to heat said resistances, and an indicator adapted to show changes in resistances.

6. The combination and arrangement of two pairs of four resistances having a negative temperature coefficient of resistivity, means for affecting both pairs substantially equally and simultaneously by heat energy delivered by conduction, means for subjecting one of the pairs to radiant energy, means for barring the other pair therefrom, a source of electrical energy to supply a current to heat both pairs of resistances, and an indicator operated by such electrical energy to show changes in resistances.

7. In a device for indicating changes in radiant heat energy, the combination of a casing carrying two pairs of substantially equal electrical resistances, a parabolic mirror encircling said casing and arranged to reflect radiant heat energy upon one of said pairs of resistances, a sliding sleeve adapted to screen the other of said electrical resistances therefrom, means for furnishing a constant current through said resistances in parallel, and an indicator to show changes in resistances due to increase or decrease of temperature in one of the pairs thereof, substantially as described.

In testimony whereof, I sign this specification in the presence of two witnesses.

RALZEMOND DRAKE PARKER.

Witnesses:
 VIRGINIA C. SPRATT,
 ELLIOTT J. STODDARD.